C. S. HOOK.
COMBINED FRICTION AND JAW CLUTCH.
APPLICATION FILED APR. 13, 1909.

930,859.  Patented Aug. 10, 1909.
2 SHEETS—SHEET 1.

WITNESSES.
D. E. Craigie.
J. E. Bayer.

INVENTOR.
C. S. HOOK.
by Fred B. Fetterbaugh, ATTY.

C. S. HOOK.
COMBINED FRICTION AND JAW CLUTCH.
APPLICATION FILED APR. 13, 1909.

930,859.

Patented Aug. 10, 1909.
2 SHEETS—SHEET 2.

WITNESSES:
D. E. Craigie.
J. E. Boyce.

INVENTOR:
C. S. HOOK,
by Fred B. Fetherstonhaugh, Atty

UNITED STATES PATENT OFFICE.

CHARLES STEWART HOOK, OF TORONTO, ONTARIO, CANADA, ASSIGNOR OF ONE-HALF TO THOMAS CHRISTOPHER HOOK.

COMBINED FRICTION AND JAW CLUTCH.

No. 930,859.     Specification of Letters Patent.     Patented Aug. 10, 1909.

Application filed April 13, 1909. Serial No. 489,729.

*To all whom it may concern:*

Be it known that I, CHARLES STEWART HOOK, of the city of Toronto, in the county of York, in the Province of Ontario, Canada, have invented certain new and useful Improvements in Combined Friction and Jaw Clutches, of which the following is the specification.

My invention relates to improvements in combined friction and jaw clutches, and the object of the invention is to provide for a freedom of movement of the sliding jaw under load into and out of engagement with its co-acting jaw, that is without any liability of binding;—secondly—to so construct the device that it will at the same time hold the friction clutch parts in co-acting relation with each other, so that the moving parts are changed without any rattle or wear, and to give the friction mechanism a permanent connection to the shaft, so that there will be no sliding motion thereof on the shaft;—thirdly—to so support the jaws in their longitudinal movement as to at all times have a maximum length of grip connection to the shaft and at the same time shorten the length of movement of the jaws and operate them by only one movement when being engaged or disengaged;—fourthly—to cause the friction clutch to engage independently of any movement of the jaws; and—fifthly—to transfer the load from the jaw to the frictions, so that both can be released together and the load removed from the jaws when they are being released. To effect these objects I have constructed my invention in the manner, which I shall hereinafter more particularly describe.

Figure 1:
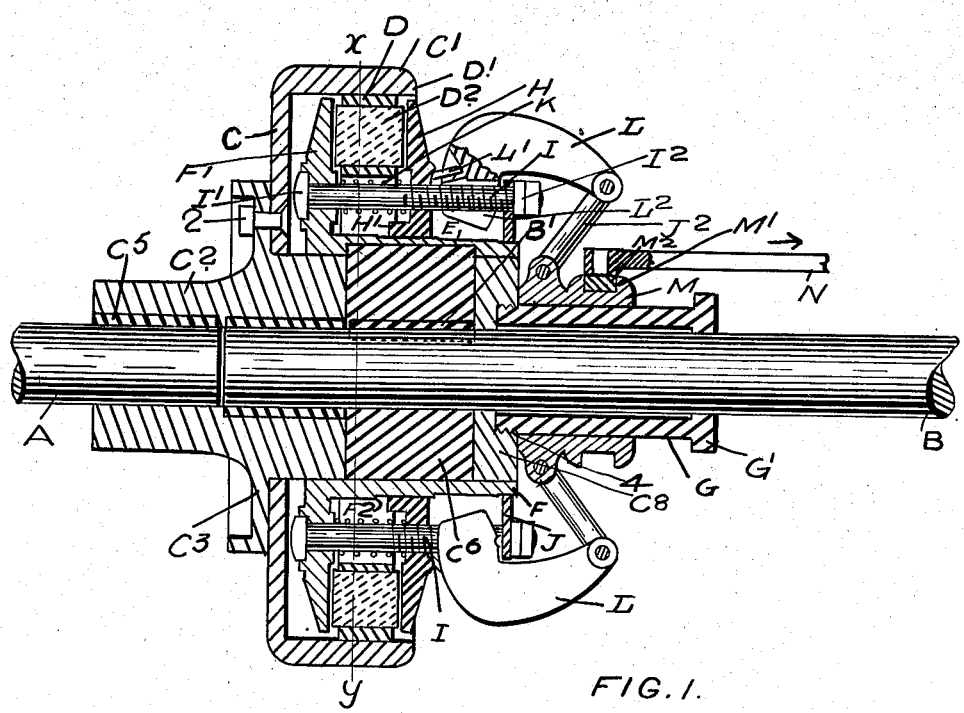
Figure 2:
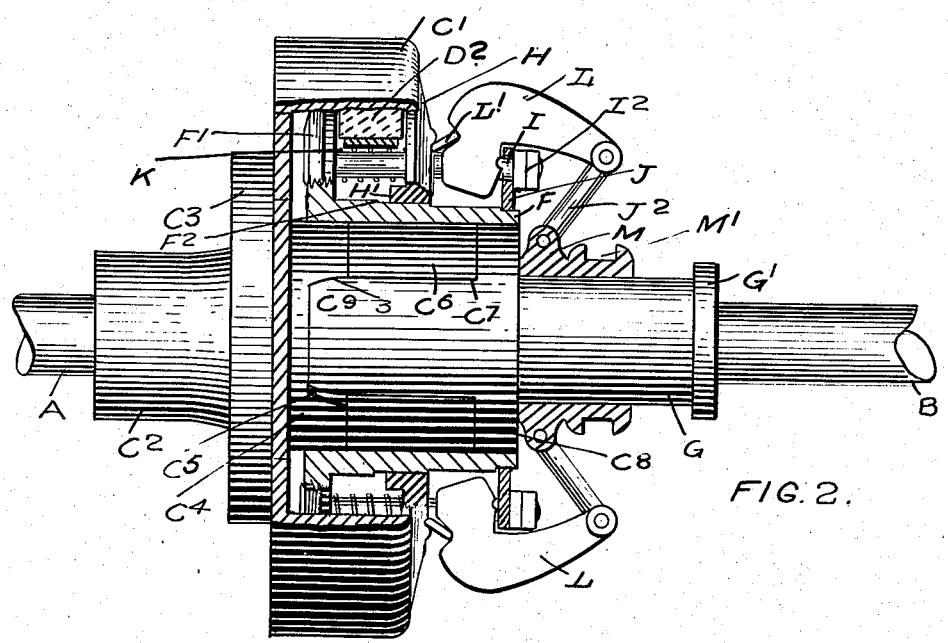
Figure 3:
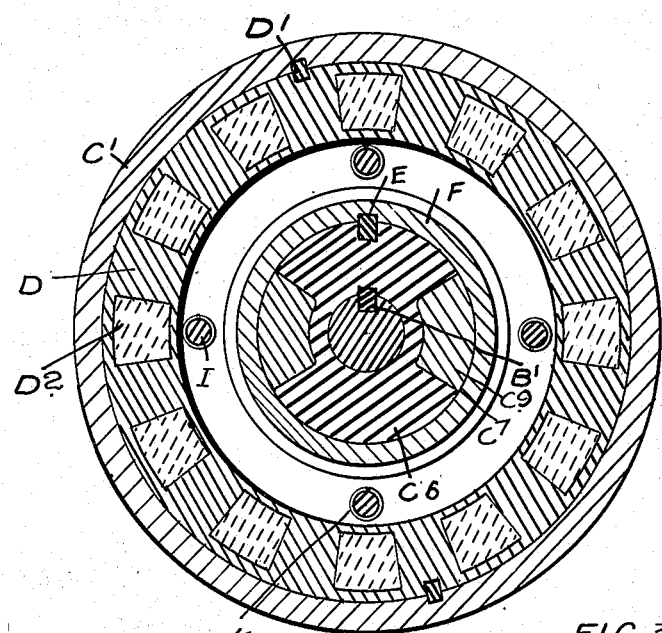
Figure 4:
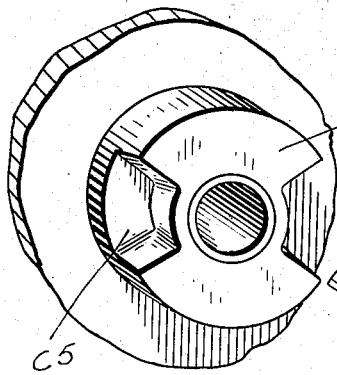
Figure 5:
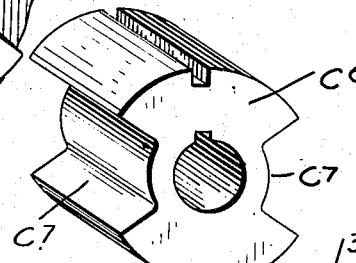
Figure 6:
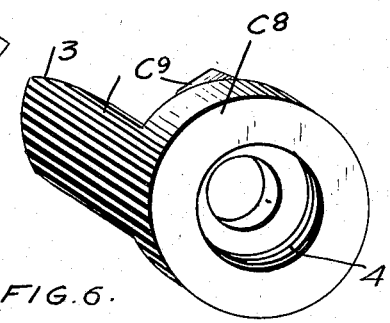

Figure 1, is a longitudinal sectional elevation on a plane through the axis of the shaft. Fig. 2, is a similar view showing however the jaw clutches in elevation. Fig. 3, is a section on the line $x$—$y$ Fig. 1. Figs. 4, 5 and 6 are perspective details showing the three portions of the clutch separated.

In the drawings like characters of reference indicate corresponding parts in each figure.

A is one shaft and B is the shaft in alinement therewith to which the shaft A is designed to be coupled.

C is a disk having a flange $C'$.

$C^2$ is a hub having a flange $C^3$ to which is secured by bolts 2 the disk C. The hub $C^2$ is secured to rotate with the shaft A by means of a key $C^5$ shown in Fig. 1. The hub $C^2$ is also provided with an annular jaw $C^4$ having recesses $C^5$ formed as indicated particularly in Fig. 4.

D is a ring, which is secured, so as to rotate with the flange $C'$ by means of a key $D'$. The ring D has openings at suitable distances apart to contain a series of wooden blocks $D^2$, which protrude from the opposite faces of the ring as indicated.

$C^6$ is the central portion of the clutch, which is provided with sectoral recesses $C^7$ of a size corresponding to the recesses $C^5$. The portion $C^6$ is secured to the shaft B by means of a key $B'$, see full lines in Fig. 3 and dotted lines in Fig. 1, and the portion $C^6$ is secured to the sleeve F by a key E, see full lines in Figs. 1 and 3.

$C^8$ is the outer portion of the clutch, which is in the form of a collar provided with projecting teeth $C^9$ of a peripheral width corresponding to the arc of the recesses $C^7$ and $C^5$. The teeth $C^9$, however, are tapered at their inner ends in arc-shape form as at 3, so as to permit ready engagement and withdrawal as will hereinafter appear.

G is a sleeve, which is screwed at the inner end into the threaded orifice 4 in the outer end of the collar $C^8$. The sleeve G is provided with an outer flange $G'$. The sleeve F is provided with a flange $F'$, which extends outwardly over the face of the blocks $D^2$ with which it is designed to engage.

H is a ring, which fits on the sleeve F being provided with an internal shoulder $H'$ designed to be brought against the shoulder $F^2$ in order to limit the sliding movement of the ring H axially. The ring H is designed also to contact with the opposite face of the blocks $D^2$ to that with which the flange $F'$ is designed to engage or contact.

I are a series of rods or bolts, which pass through the rings H flange $F'$ and a second ring J slidable axially on the sleeve F. The rods I have heads $I'$, which engage the flange $F'$ and nuts $I^2$ on the opposite side on the outside of the ring J.

K are spiral springs encircling the bolts or rods I and extending between the ring H and the flange $F'$.

L are levers, which are pivotally connected by links $L'$ to the ring H and said levers are each provided with an orifice $L^2$ through which the bolts I extend. The form of the levers otherwise is unimportant as they have been described in a former patent. The levers, however, are pivotally connected by links J² to the collar M located on the sleeve G. The collar M has an annular groove M' in which fits a split collar M², which is operable through a link N shown and a lever not shown.

Having described the principal parts involved in my invention I shall briefly describe its operation and utility. My invention is shown as applied to a shaft coupling, but it will, of course, be understood that it may be with equal facility applied to transmission gear. The jaws C⁹ and C³ and C⁴ are shown engaged. By throwing the link in the direction indicated by arrow the collar is moved longitudinally on the sleeve G and the friction flanges H and F are thrown into engagement with the blocks D² and when the collar M reaches the flange G' the jaws C⁹ are drawn from the recesses C⁵ of the jaw C⁴ backwardly into the recesses C⁷ of the central portion C⁶ which is one with the sleeve F as to rotation, and thereby a perfect freedom of movement in the disengaging of the jaws is assured and sliding of the movable jaw on the key as in my former patent is entirely obviated. The engagement of the friction clutches is also assured, so that the load is transferred from the jaws to the friction clutch immediately upon their being released. To throw in the jaws again the exact reverse of the operation takes place, the jaws being engaged immediately before the friction clutch is released. It will also be seen that the friction clutch is entirely independent of any movement of the jaws and that the load is transferred from the jaws to the friction clutch, so that they can be both released together and the load removed from the jaws when they are being released.

What I claim as my invention is.

1. In a combined friction and jaw clutch, the combination with the friction ring and disk and hub to which the disk is secured keyed to the driving shaft and an annular jaw connected to the hub provided with end recesses, of an intermediate clutch guiding portion provided with side recesses and keyed to the driven shaft, the end collar provided with inwardly projecting teeth located in and designed to move in the recesses, the sleeve keyed to the clutch guiding portion and provided with an annular outwardly extending flange, a supplemental flange located on the aforesaid sleeve, bolts passing through the flanges, springs located on the bolts between the flanges and means for simultaneously reversing the operation of the friction clutch and jaws as and for the purpose specified.

2. In a combined friction and jaw clutch, the combination with the friction ring and disk and hub to which the disk is secured keyed to the driving shaft and an annular jaw connected to the hub provided with end recesses, of an intermediate clutch guiding portion provided with side recesses and keyed to the driven shaft, the end collar provided with inwardly projecting teeth located in and designed to move in the recesses, the sleeve keyed to the clutch guiding portion and provided with an annular outwardly extending flange, a supplemental flange located on the aforesaid sleeve, bolts passing through the flanges, springs located on the bolts between the flanges, the sleeve located on the shaft and secured in the end of the outer collar of the clutch and provided with an outer flange, the collar located on the sleeve, means for operating the collar and means for operatively connecting the collar to the co-acting flanges of the sleeve surrounding the jaw clutch as and for the purpose specified.

CHARLES STEWART HOOK.

Witnesses:
B. BOYD,
R. COBAIN.